(12) United States Patent
Ishimasa et al.

(10) Patent No.: US 10,914,261 B2
(45) Date of Patent: Feb. 9, 2021

(54) INTAKE AIR COOLING APPARATUS ABNORMALITY DETECTION SYSTEM FOR INTERNAL COMBUSTION ENGINE

(71) Applicant: HONDA MOTOR CO., LTD., Tokyo (JP)

(72) Inventors: Jyo Ishimasa, Wako (JP); Hisashi Daicho, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 13 days.

(21) Appl. No.: 16/391,747

(22) Filed: Apr. 23, 2019

(65) Prior Publication Data

US 2019/0331045 A1    Oct. 31, 2019

(30) Foreign Application Priority Data

Apr. 25, 2018 (JP) ................. 2018-084020

(51) Int. Cl.
*F02D 41/00* (2006.01)
*F02D 41/14* (2006.01)
*F01P 11/16* (2006.01)
*F02B 37/12* (2006.01)

(52) U.S. Cl.
CPC .......... *F02D 41/1495* (2013.01); *F01P 11/16* (2013.01); *F02B 37/12* (2013.01); *F02D 41/0002* (2013.01); *F02D 41/144* (2013.01)

(58) Field of Classification Search
CPC ........ F01P 11/14; F01P 11/16; F01P 2060/02; F02B 29/0443; F02B 37/12; F02D 2200/0402; F02D 2200/0404; F02D 2200/0406; F02D 2200/0414; F02D 41/0002; F02D 41/0007; F02D 41/144; F02D 41/1495; F02D 41/22; F02D 41/2403

See application file for complete search history.

(56) References Cited

U.S. PATENT DOCUMENTS

| 6,529,815 B2* | 3/2003 | Hawkins | F02D 41/0007 |
| | | | 123/198 D |
| 9,109,544 B2* | 8/2015 | Vasallo | F02D 41/0007 |
| 9,534,968 B2* | 1/2017 | Nakano | F02D 41/222 |

(Continued)

FOREIGN PATENT DOCUMENTS

JP    S6036728 A    2/1985

*Primary Examiner* — Carl C Staubach
(74) *Attorney, Agent, or Firm* — Westerman, Hattori, Daniels & Adrian, LLP (57) ABSTRACT

An intake air cooling apparatus abnormality detection system for an engine includes a first intake air temperature sensor that detects an intake air temperature in an intake pipe at the downstream side of an intercooler and a second intake air temperature sensor that detects the intake air temperature in an intake manifold. An abnormality determination unit determines that an abnormality occurs in an intercooler cooling water circuit if a state in which at least one of a value based on an output from the first intake air temperature sensor and a value based on an output from the second intake air temperature sensor exceeds a predetermined threshold value continues for a certain time or longer when a load state determination unit determines that the engine is in a high load state.

4 Claims, 6 Drawing Sheets

(56) References Cited

U.S. PATENT DOCUMENTS

| | | | |
|---|---|---|---|
| 2006/0086089 A1* | 4/2006 | Ge | F02B 37/22 60/599 |
| 2011/0197580 A1* | 8/2011 | Andrasko | F02D 41/0007 60/602 |
| 2011/0251825 A1* | 10/2011 | Nagoshi | F02D 41/222 702/183 |
| 2014/0352661 A1* | 12/2014 | Glugla | F02D 41/04 123/406.19 |
| 2015/0142338 A1* | 5/2015 | Nakano | F02B 29/0462 702/35 |
| 2016/0169100 A1* | 6/2016 | Hanawa | F02M 26/22 73/114.68 |
| 2018/0320626 A1* | 11/2018 | Surnilla | F02D 41/023 |

* cited by examiner

FIG. 4D
DETERMINATION-OF-ABNORMALITY
START PERMISSION FLAG

FIG. 4E
ABNORMALITY
DETERMINATION
TIMER

FIG. 4F
INTAKE-AIR-TEMPERATURE
ABNORMALITY FIXING FLAG

FIG. 4G
SUPERCHARGE STOP
REQUEST FLAG

INTAKE AIR COOLING APPARATUS ABNORMALITY DETECTION SYSTEM FOR INTERNAL COMBUSTION ENGINE

CROSS REFERENCES TO RELATED APPLICATIONS

The present application claims priority under 35 U.S.C. § 119 to Japanese Patent Application No. 2018-084020, filed Apr. 25, 2018, entitled "Intake Air Cooling Apparatus Abnormality Detection System for Internal Combustion Engine." The contents of this application are incorporated herein by reference in their entirety.

BACKGROUND

1. Field

The present disclosure relates to an intake air cooling apparatus abnormality detection system for an internal combustion engine. Specifically, the present disclosure relates to a system that detects an abnormality in an intake air cooling apparatus in an internal combustion engine based on outputs from intake air temperature sensors provided on an intake path of the internal combustion engine. internal combustion engine

2. Description of the Related Art

Systems have hitherto been known, which compress air with superchargers and supply the compressed supercharged air to internal combustion engines and which are provided with intercoolers for cooling the supercharged air the temperature of which is increased due to the compression.

In order to effectively suppress the increase in temperature of the supercharged air in such a system, a technology is proposed (for example, refer to Japanese Unexamined Patent Application Publication No. 60-36728) in which an intake air temperature sensor is provided on an intake path of the internal combustion engine to control supercharged pressure based on a value detected by the intake air temperature sensor.

However, in the case of the system that detects an abnormality in the intake air cooling apparatus including the intercooler of the internal combustion engine based on one intake air temperature sensor provided on the intake path of the internal combustion engine, if a characteristic abnormality (for example, a shift of a zero point due to deterioration or abnormal correlation between actual temperatures and an output from the sensor) occurs in the intake air temperature sensor, the abnormality may not be detected in spite of the temperature at which the abnormality should be practically detected. For example, when the threshold value of the temperature at which an abnormality in the intake air cooling apparatus is detected is set to 100° C. and the value detected by the intake air temperature sensor is shifted from the actual temperature by −20° C. due to the characteristic abnormality, there is a problem in that the value detected by the intake air temperature sensor is 90° C. even when the actual temperature is 110° C. and the abnormality in the intake air cooling apparatus is not detected.

When the abnormality in the intake air cooling apparatus is not appropriately detected, particularly when the engine the intake air temperature of which is increased is in a high load state, thermal damage may occur in a component, such as a throttle valve, provided on the intake path of the internal combustion engine.

In order to resolve the above problems, there is a need to provide an intake air cooling apparatus abnormality detection system for an internal combustion engine, which is capable of reliably detecting an abnormality in an intake air cooling apparatus without delay even if a characteristic abnormality occurs in an intake air temperature sensor.

SUMMARY (1) The present application describes an intake air cooling apparatus abnormality detection system for an internal combustion engine. The intake air cooling apparatus abnormality detection system includes a first intake air temperature sensor that detects an intake air temperature in an intake pipe that is provided at a downstream side of a heat exchanger (for example, an intercooler) provided at the downstream side of a supercharger (for example, a turbo charger) and that is provided at an upstream side of an intake valve (for example, a throttle valve) and a second intake air temperature sensor that detects the intake air temperature in an intake manifold provided at the downstream side of the intake valve. The intake air cooling apparatus abnormality detection system includes a load state determination unit (for example, a load state determiner) that determines a load state of the internal combustion engine and an abnormality determination unit (for example, an abnormality determiner) that determines whether an abnormality occurs in an intake air cooling apparatus (for example, an intercooler cooling water circuit) including the heat exchanger. The abnormality determination unit determines that an abnormality occurs in the intake air cooling apparatus if a state in which at least one of a value based on an output from the first intake air temperature sensor and a value based on an output from the second intake air temperature sensor exceeds a predetermined threshold value continues for a certain (predetermined) time or longer when the load state determination unit determines that the internal combustion engine is in a certain (predetermined) load state (for example, a high load state). The word "unit" used in this application may mean a physical part or component of computer hardware or any device including a controller, a processor, a memory, etc., which is particularly configured to perform functions and processes disclosed in the application.

In the intake air cooling apparatus abnormality detection system in (1), it is determined that an abnormality occurs in the intake air cooling apparatus if the state in which at least one of the value based on the output from the first intake air temperature sensor and the value based on the output from the second intake air temperature sensor exceeds a predetermined threshold value continues for a certain time or longer when the load state determination unit determines that the internal combustion engine is in a certain load state (for example, the high load state).

Accordingly, when the internal combustion engine is in the high load state even if a characteristic abnormality occurs in one of the intake air temperature sensors, it is possible to reliably determine that an abnormality occurs in the intake air cooling apparatus without delay.

(2) The certain time is preferably set in accordance with a pressure difference between atmospheric pressure and pressure in the intake manifold.

In the intake air cooling apparatus abnormality detection system in (2), the certain time is set in accordance with the pressure difference between the atmospheric pressure and the pressure in the intake manifold.

The pressure difference between the atmospheric pressure and the pressure in the intake manifold is a value that reflects the supercharge state by the supercharger. Accordingly, according to the intake air cooling apparatus abnormality detection system in (2), it is possible to appropriately set the certain time before it is determined that an abnormality occurs in the intake air cooling apparatus in accordance with the supercharge state by the supercharger.

(3) The certain time may be shortened as the pressure difference between the atmospheric pressure and the pressure in the intake manifold is increased.

In the intake air cooling apparatus abnormality detection system in (3), the certain time is shortened as the pressure difference between the atmospheric pressure and the pressure in the intake manifold is increased.

The degree of supercharge is increased as the pressure difference between the atmospheric pressure and the pressure in the intake manifold is increased. Since the intake air temperature is rapidly increased at this time, it is preferred that the abnormality in the intake air cooling apparatus be rapidly detected. Accordingly, according to the intake air cooling apparatus abnormality detection system in (3), shortening the certain time before it is determined that an abnormality occurs in the intake air cooling apparatus in accordance with the supercharge state by the supercharger enables the abnormality in the intake air cooling apparatus to be more appropriately detected.

(4) If the abnormality determination unit determines that an abnormality occurs in the intake air cooling apparatus, a supercharge stop request signal for requesting the supercharger to stop supercharge may be output.

In the intake air cooling apparatus abnormality detection system in (4), if it is determined that an abnormality occurs in the intake air cooling apparatus, the supercharge stop request signal for requesting the supercharger to stop the supercharge is output. Accordingly, it is possible to prevent thermal damage to the intake valve or the like even if a characteristics abnormality occurs in one of the intake air temperature sensors.

(5) The load state determination unit may determine that the internal combustion engine is in the certain load state in a state in which a pressure difference between atmospheric pressure and pressure in the intake manifold is greater than a predetermined value and in a state in which a position of the intake valve is greater than a predetermined position, in the state in which the pressure difference between the atmospheric pressure and the pressure in the intake manifold is greater than the predetermined value, or in the state in which the position of the intake valve is greater than the predetermined position.

In the intake air cooling apparatus abnormality detection system in (5), the load state determination unit determines that the internal combustion engine is in the certain load state in the state in which the pressure difference between the atmospheric pressure and the pressure in the intake manifold is greater than a predetermined value and/or in the state in which the position of the intake valve is greater than a predetermined position. Accordingly, it is possible to accurately determine the load state of the internal combustion engine.

According to the present disclosure, it is possible to provide an intake air cooling apparatus abnormality detection system for an internal combustion engine, which is capable of reliably detecting an abnormality in an intake air cooling apparatus without delay even if a characteristic abnormality occurs in an intake air temperature sensor.

DESCRIPTION OF THE PREFERRED EMBODIMENTS

First Embodiment

A first embodiment of the present disclosure will herein be described in detail with reference to the drawings.

Figure 1:
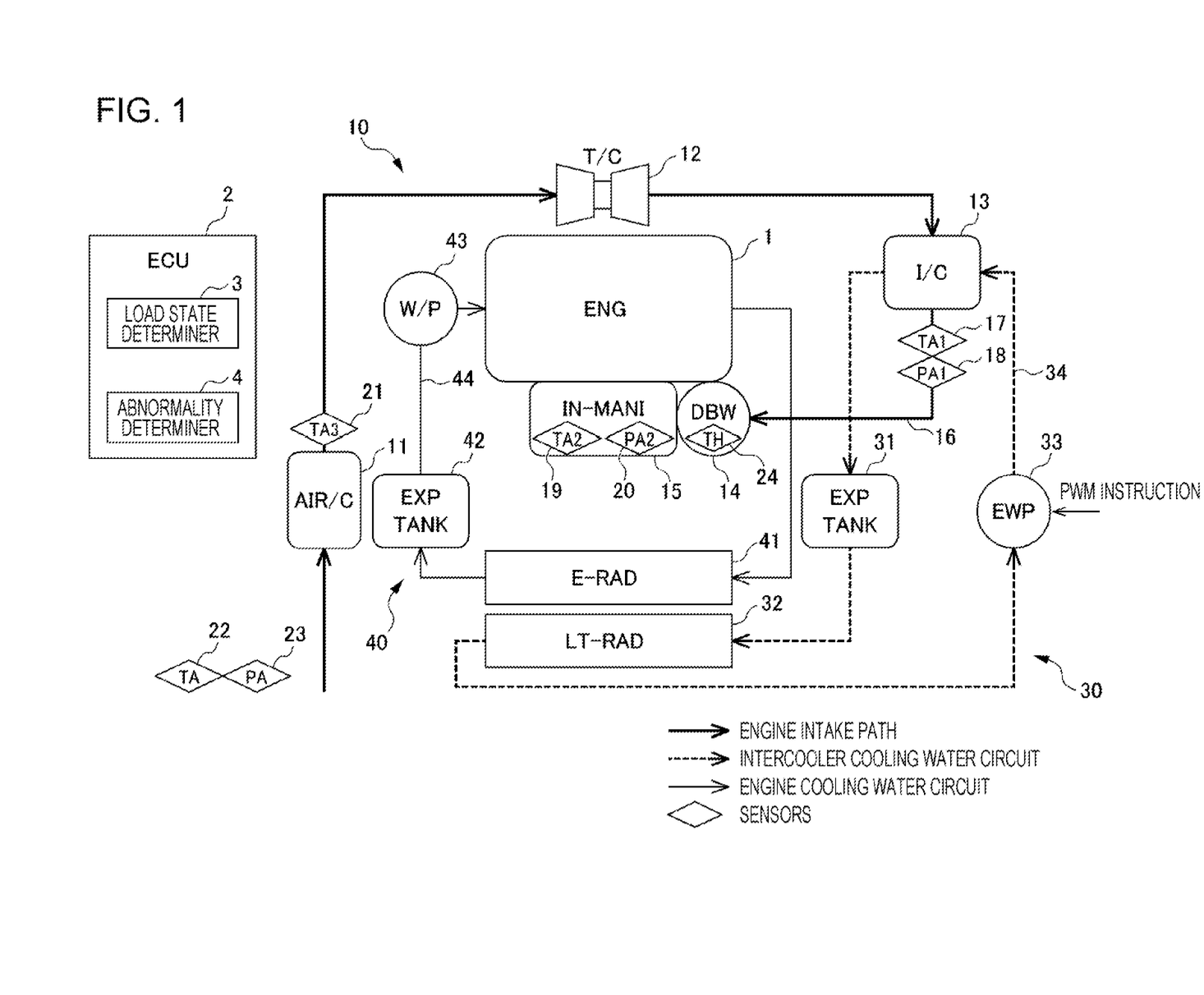
FIG. 1 illustrates an exemplary configuration of an internal combustion engine, an intake path for the internal combustion engine, an intake air cooling apparatus, an internal combustion engine cooling water circuit, and an electronic control unit (ECU) controlling the above components, according to a first embodiment of the present disclosure.

FIG. 1 illustrates an exemplary configuration of an engine 1 serving as an internal combustion engine, an engine intake path 10, an intercooler cooling water circuit 30 serving as an intake air cooling apparatus, an engine cooling water circuit 40, and an electronic control unit (ECU) 2 controlling the above components, according to the first embodiment.

The engine 1 is a gasoline engine that directly injects fuel into a combustion chamber of each cylinder (not illustrated). A fuel injection valve (not illustrated) is provided for each cylinder. The opening times and the closing times of the fuel injection valves are controlled by the ECU 2. The ECU 2 also controls, for example, a turbo charger 12 and a throttle valve 14 on the engine intake path described below.

The engine intake path 10 is coupled at the upstream side of the engine 1. On the engine intake path 10, an air intake (not illustrated), an air cleaner 11, the turbo charger 12 serving as a supercharger, an intercooler 13 serving as a heat exchanger, the throttle valve 14 serving as an intake valve, and an intake manifold 15 serving as an intake air manifold are disposed in this order from the upstream side to the downstream side. These components are coupled to each other directly or via an intake pipe 16.

Dust or the like is removed from air taken by the air intake with the air cleaner 11 and the air is sucked into the turbo charger 12. The air, the temperature of which is increased through supercharge with the turbo charger 12, is fed into the combustion chamber in the engine 1 via the intake pipe 16, the throttle valve 14, and the intake manifold 15 in a state in which the air is cooled with the intercooler 13 provided downstream of the turbo charger 12.

A first intake-air temperature sensor 17 for detecting an intake air temperature TA1 in the intake pipe 16 and a first intake-air pressure sensor 18 for detecting pressure PA1 in the intake pipe 16 are provided in the intake pipe 16 between the intercooler 13 and the throttle valve 14. In addition, a second intake-air temperature sensor 19 for measuring an intake air temperature TA2 in the intake manifold 15 and a second intake-air pressure sensor 20 for detecting pressure PA2 in the intake manifold 15 are provided in the intake manifold 15. Furthermore, a third intake-air temperature sensor 21 is provided near the outlet of the air cleaner 11 to measure an intake air temperature TA3 of a portion near the outlet of the air cleaner 11. A temperature sensor 22 for measuring an intake air temperature TA near the air intake and an atmospheric pressure sensor 23 for measuring atmospheric pressure PA are provided near the air intake (not illustrated). A throttle position sensor 24 for detecting a throttle position is provided in the throttle valve 14. The outputs from these sensors are supplied to the ECU 2.

The intercooler cooling water circuit 30 is provided to cool intake air in the engine intake path 10 at the downstream side of the turbo charger 12 and is provided with the intercooler 13. The intercooler cooling water circuit 30 includes the intercooler 13, an expansion tank 31, a low temperature radiator 32, and an electrically-driven water pump 33. These components are coupled to each other via an intercooler cooling water channel 34 along which intercooler cooling water is circulated.

In the intercooler cooling water circuit 30 configured in the above manner, the electrically-driven water pump 33 receives, for example, a pulse width modulation signal in accordance with an output from the first intake-air temperature sensor 17 in the intake pipe 16 for operation to circulate the intercooler cooling water in the circuit. Specifically, the intercooler cooling water sequentially flows through the electrically-driven water pump 33, the intercooler 13, the expansion tank 31, and the low temperature radiator 32 and return back to the electrically-driven water pump 33 for circulation.

The engine cooling water circuit 40 includes the engine 1, an engine radiator 41, an expansion tank 42, and a water pump 43. These components are coupled to each other via an engine cooling water channel 44 along which engine cooling water is circulated.

In the engine cooling water circuit 40 configured in the above manner, the water pump 43 operates to circulate the engine cooling water in the circuit. Specifically, the engine cooling water sequentially flows through the water pump 43, the engine 1, the engine radiator 41, and the expansion tank 42 and returns back to the water pump 43 for circulation.

As described above, the multiple intake-air temperature sensors, the multiple intake-air pressure sensors, the atmospheric pressure sensor, and the throttle position sensor are connected to the ECU 2.

The ECU 2 includes an input circuit and a central processing unit (CPU). The input circuit has functions to, for example, shape the waveforms of signals input from the various sensors, correct the voltage level to a predetermined level, and convert an analog signal value into a digital signal value. In addition, the ECU 2 includes a storage circuit that stores various arithmetic programs executed by the CPU, the results of arithmetic operations, and so on and an output circuit that supplies a control signal to the engine 1.

Furthermore, the ECU 2 includes a load state determiner 3 that determines a load state of the engine 1.

In general, when the engine 1 is in a high load state, a pressure difference $\Delta P$ between the atmospheric pressure PA detected by the atmospheric pressure sensor 23 and the pressure PA2 detected by the second intake-air pressure sensor 20 for detecting the pressure in the intake manifold 15 is increased. In the high load state of the engine 1, the throttle position of the throttle valve 14 is increased.

Accordingly, the load state determiner 3 determines that the engine 1 is in a certain load state, that is, in the high load state if the pressure difference $\Delta P$ is greater than a predetermined value and the throttle position is greater than a predetermined position. Since the load state determiner 3 of the first embodiment determines the load state of the engine 1 based on both the pressure difference $\Delta P$ and the throttle position in the above manner, the load state of the engine 1 is capable of being more accurately determined.

An aspect may be assumed in which the load state determiner determines the load state of the engine based on either of the pressure difference $\Delta P$ and the throttle position. Alternatively, an aspect may be assumed in which the load state determiner determines the load state of the engine based on other information.

The ECU 2 having the above configuration includes an abnormality determiner 4 that detects an intake-air temperature abnormal state based on the outputs from the first intake-air temperature sensor 17 and the second intake-air temperature sensor 19 and so on and determines that an abnormality occurs in the intercooler cooling water circuit 30 including the intercooler 13, that is, in the intake air cooling apparatus if the intake-air temperature abnormal state is detected.

In the first embodiment, the first intake-air temperature sensor 17, the second intake-air temperature sensor 19, and the load state determiner 3 and the abnormality determiner 4 in the ECU 2 compose an intake air cooling apparatus abnormality detection system according to an embodiment of the present disclosure.

Figure 2:
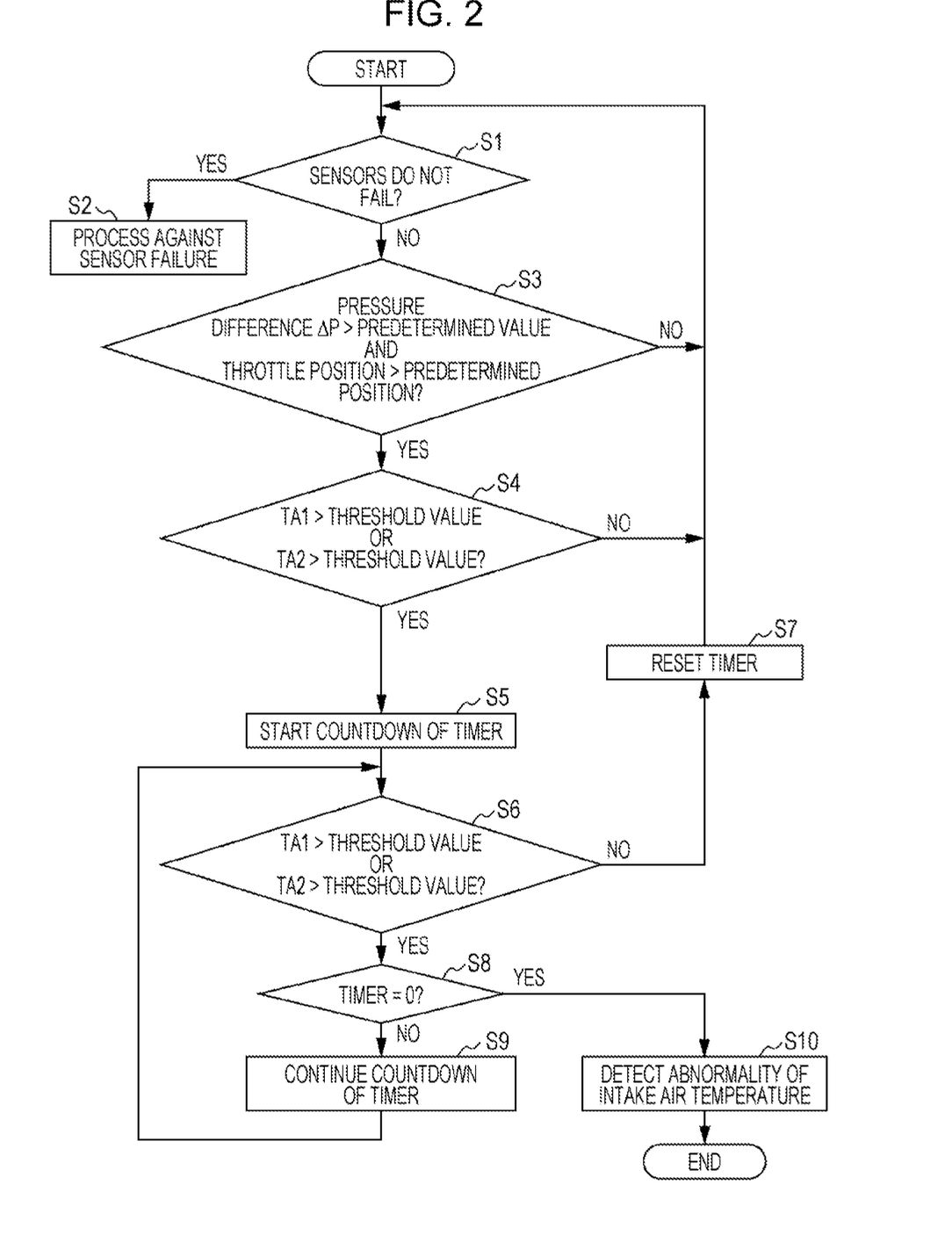
FIG. 2 is a flowchart illustrating a specific example of an abnormality determination process in an intake air cooling apparatus abnormality detection system according to the first embodiment.

FIG. 2 is a flowchart illustrating an exemplary determination process of detecting the intake-air temperature abnormal state based on the outputs from the intake air temperature sensors and so on and determining that an abnormality occurs in the intercooler cooling water circuit 30 if the intake-air temperature abnormal state is detected.

Referring to FIG. 2, in Step S1, the ECU 2 determines whether the outputs from the respective sensors including the first intake-air temperature sensor 17, the second intake-air temperature sensor 19, and the throttle position sensor 24 are acquired, that is, whether each sensor does not fail.

If the output from at least one sensor, among the respective sensors, is not acquired, that is, if at least one sensor fails (YES in Step S1), the process goes to Step S2. In Step S2, a process against the sensor failure is performed. For example, the fact that the sensor fails is externally announced.

If the outputs from the respective sensors are acquired, that is, if the respective sensors do not fail (NO in Step S1), the process goes to Step S3.

In Step S3, the load state determiner 3 in the ECU 2 determines whether the pressure difference $\Delta P$ between the atmospheric pressure PA detected by the atmospheric pressure sensor 23 and the pressure PA2 detected by the second intake-air pressure sensor 20 for detecting the pressure in the intake manifold 15 is greater than a predetermined value and the throttle position is greater than a predetermined position.

If the pressure difference $\Delta P$ is smaller than or equal to the predetermined value or the throttle position is smaller than or equal to the predetermined position (NO in Step S3), the process goes back to Step S1.

If the pressure difference $\Delta P$ is greater the predetermined value and the throttle position is greater than the predetermined position (YES in Step S3), the load state determiner 3 determines that the engine is in the high load state, which is a certain load state. Then, the process goes to Step S4.

In Step S4, the abnormality determiner 4 in the ECU 2 determines whether the value of at least one of the intake air temperature TA1 based on the output from the first intake-air temperature sensor 17 and the intake air temperature TA2 based on the output from the second intake-air temperature sensor 19 exceeds a predetermined threshold value.

If both the intake air temperature TA1 based on the output from the first intake-air temperature sensor 17 and the intake air temperature TA2 based on the output from the second intake-air temperature sensor 19 do not exceed the predetermined threshold value (NO in Step S4), the process goes back to Step S1.

If the value of at least one of the intake air temperature TA1 based on the output from the first intake-air temperature sensor 17 and the intake air temperature TA2 based on the output from the second intake-air temperature sensor 19 exceeds the predetermined threshold value (YES in Step S4), the process goes to Step S5.

In Step S5, countdown of a timer is started.

In Step S6, the abnormality determiner 4 in the ECU 2 determines again whether the value of at least one of the intake air temperature TA1 based on the output from the first intake-air temperature sensor 17 and the intake air temperature TA2 based on the output from the second intake-air temperature sensor 19 exceeds the predetermined threshold value.

If both the intake air temperature TA1 based on the output from the first intake-air temperature sensor 17 and the intake air temperature TA2 based on the output from the second intake-air temperature sensor 19 do not exceed the predetermined threshold value (NO in Step S6), the process goes to Step S7. In Step S7, the timer is reset. Then, the process goes back to Step S1.

If the value of at least one of the intake air temperature TA1 based on the output from the first intake-air temperature sensor 17 and the intake air temperature TA2 based on the output from the second intake-air temperature sensor 19 exceeds the predetermined threshold value (YES in Step S6), the process goes to Step S8. In Step S8, it is determined whether the value of the timer reaches zero.

If the value of the timer does not reach zero (NO in Step S8), the process goes to Step S9. In Step S9, the countdown of the timer is continued. Then, the process goes back to Step S6.

If the value of the timer reaches zero (YES in Step S8), the process goes to Step S10. In Step S10, the intake-air temperature abnormal state is detected and it is determined that an abnormality occurs in the intercooler cooling water circuit 30. Then, the process illustrated in FIG. 2 is terminated.

When the intake-air temperature abnormal state is detected and it is determined that an abnormality occurs in the intercooler cooling water circuit 30 in the above determination process, for example, a supercharge stop request signal for requesting the turbo charger 12 to stop the supercharge is output.

Accordingly, even if a characteristic abnormality (for example, a shift of a zero point due to deterioration or abnormal correlation between actual temperatures and outputs from the sensors) occurs in one of the first intake-air temperature sensor 17 and the second intake-air temperature sensor 19, it is possible to reliably detect the intake-air temperature abnormal state without delay and determine that an abnormality occurs in the intercooler cooling water circuit 30. In this case, performing control, for example, stopping of the supercharge enables thermal damage to the throttle valve 14 or the like to be prevented.

In the above determination process, the performance of detection in the abnormal state is improved using the first intake-air temperature sensor 17 and the second intake-air temperature sensor 19 while the countdown of the timer is performed. Accordingly, it is possible to prevent an instantaneous abnormal value of each intake air temperature sensor due to noise or the like from being falsely determined to be the intake-air temperature abnormal state to avoid, for example, unnecessary stopping of the supercharge.

Using the above process, even if the intercooler cooling water circuit 30 including the intercooler 13 fails, it is possible to reliably detect the intake-air temperature abnormal state without delay. In addition, performing control, such as stopping of the supercharge, at this time enables the thermal damage to the throttle valve 14 or the like to be prevented.

Although it is determined that the engine is in the high load state, which is a certain load state, and the process goes to Step S4 if the pressure difference ΔP is greater than the predetermined value and the throttle position is greater than the predetermined positive in Step S3, it may be determined that the engine is in the high load state, which is a certain load state, and the process may go to Step S4 if either of the above conditions is met.

The values based on the outputs from the respective intake air temperature sensors in Step S4 and Step S6 may be the output values from the intake air temperature sensors or may be signals values or temperatures based on the output values from the intake air temperature sensors. In addition, the values based on the outputs from the respective intake air temperature sensors in Step S4 and Step S6 are not limited to the values acquired by directly measuring the temperatures of the intake air in the intake pipe and the intake manifold and may be measured values reflecting the temperatures of the intake air in the intake pipe and the intake manifold, for example, may be the temperatures of the intake pipe and the intake manifold themselves.

The threshold value compared with the intake air temperature TA1 based on the output from the first intake-air temperature sensor 17 may be the same as or may be different from the threshold value compared with the intake air temperature TA2 based on the output from the second intake-air temperature sensor 19 in Step S4 and Step S6.

If, for example, the intake air temperature TA1 based on the output from the first intake-air temperature sensor 17, among the first intake-air temperature sensor 17 and the second intake-air temperature sensor 19, exceeds the predetermined threshold value in Step S4, the steps subsequent to Step S4 may be performed based on only the intake air temperature TA1 based on the output from the first intake-air temperature sensor 17, among the first intake-air temperature sensor 17 and the second intake-air temperature sensor 19. In other words, in this case, it is determined in Step S6 whether the state in Step S4 (the state in which the intake air temperature TA1 exceeds the threshold value) is kept.

If, for example, the intake air temperature TA2 based on the output from the second intake-air temperature sensor 19, among the first intake-air temperature sensor 17 and the second intake-air temperature sensor 19, exceeds the predetermined threshold value in Step S4, the steps subsequent to Step S4 may be performed based on only the intake air temperature TA2 based on the output from the second intake-air temperature sensor 19, among the first intake-air temperature sensor 17 and the second intake-air temperature sensor 19. In other words, in this case, it is determined in Step S6 whether the state in Step S4 (the state in which the intake air temperature TA2 exceeds the threshold value) is kept.

In the above determination process, the abnormality determiner 4 determines the cooling state of the intake air if the load state determiner 3 determines in Step S3 that the engine is in the high load state, which is a certain load state. The reason for this determination will now be described with reference to FIG. 3.

Figure 3:
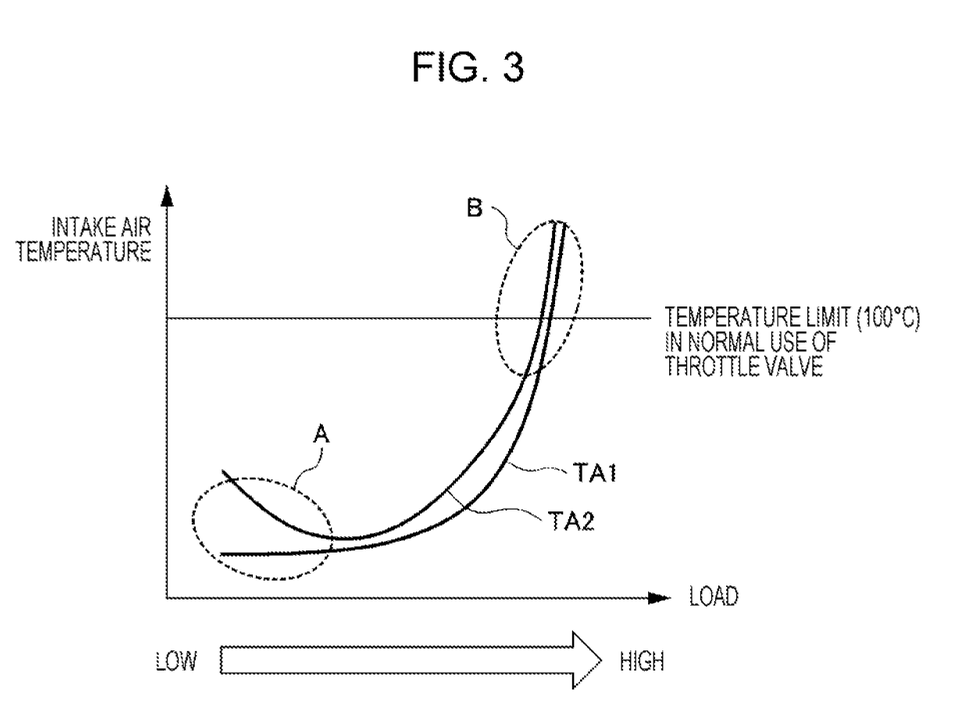
FIG. 3 is a graph illustrating the relationship between the load state of an engine and an intake air temperature in the intake air cooling apparatus abnormality detection system according to the first embodiment.

FIG. 3 is a graph illustrating the relationship between the load state of the engine and the intake air temperature.

Since the temperature limit in normal use of the throttle valve 14 is generally about 100° C., the stopping of the supercharge is preferably performed when the intake air temperature reaches about 100° C. in order to prevent the thermal damage to the throttle valve 14. As illustrated in an area B in FIG. 3, the engine is in the high load state when the intake air temperature is about 100° C. Accordingly, it is sufficient to perform the accurate confirmation of the state of the intake air temperature using the multiple intake air temperature sensors when it is determined that the engine is in the high load state.

A gap exists between the intake air temperature measured by the first intake-air temperature sensor 17 and the intake air temperature measured by the second intake-air temperature sensor 19 when the engine is in a low load state, as illustrated in an area A in FIG. 3, while the intake air temperature measured by the first intake-air temperature sensor 17 is substantially equal to the intake air temperature measured by the second intake-air temperature sensor 19 when the engine is in the high load state, as in the area B in FIG. 3.

In other words, the intake air temperature TA2 in the intake manifold 15 is substantially equal to the intake air temperature TA1 immediately after the cooling with the intercooler 13 when the engine is in the high load state. Accordingly, it is possible to appropriately determine whether an abnormality occurs in the cooling function of the intercooler 13 also with the second intake-air temperature sensor 19, which measures the intake air temperature TA2 in the intake manifold 15.

When the engine is in the high load state, the abnormality determination process using the threshold value is capable of being more appropriately performed. For example, substantially the same threshold value may be used for the intake air temperatures measured by the first intake-air temperature sensor 17 and the second intake-air temperature sensor 19.

The characteristic abnormality of the intake air temperature sensors is also capable of being determined using the characteristics illustrated in FIG. 3. Specifically, a first temperature difference between the intake air temperatures measured by the first intake-air temperature sensor 17 and the second intake-air temperature sensor 19 when the engine 1 is in the low load state and the intake air temperatures are low is compared with a second temperature difference between the intake air temperatures measured by the first intake-air temperature sensor 17 and the second intake-air temperature sensor 19 when the engine 1 is in the high load state and the intake air temperatures are high. As illustrated in FIG. 3, the first temperature difference is generally greater than the second temperature difference. If this relationship is reversed, that is, if the second temperature difference is greater than the first temperature difference, it may be determined that a characteristic abnormality occurs in either of the first intake-air temperature sensor 17 and the second intake-air temperature sensor 19. Abnormal correlation between actual temperatures and outputs from the sensors is considered as the characteristic abnormality in this case.

FIGS. 4A to 4G are time charts illustrating an exemplary process of detecting the intake-air temperature abnormal state based on the outputs from the intake air temperature sensors and so on and determining that an abnormality occurs in the intercooler cooling water circuit 30 if the intake-air temperature abnormal state is detected.

Figure 4A:
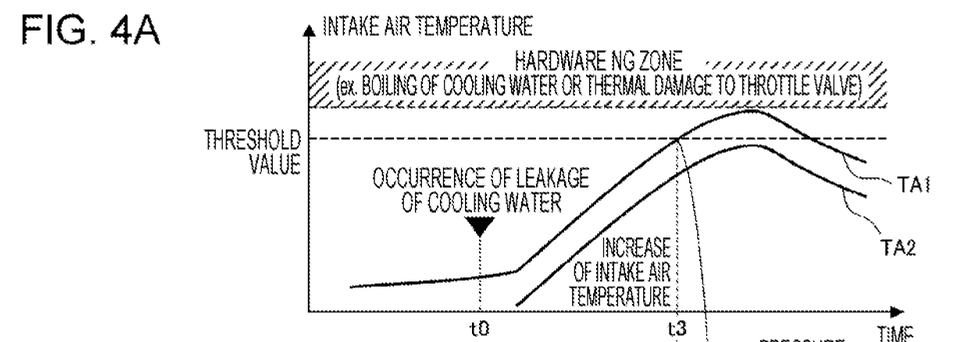
FIGS. 4A to 4G are time charts illustrating an example of the abnormality determination process in the intake air cooling apparatus abnormality detection system according to the first embodiment.

A case will now be described here in which leakage of the cooling water from the intercooler cooling water channel 34 in the intercooler cooling water circuit 30 occurs at a time to, as illustrated in FIG. 4A.

When the leakage of the cooling water occurs at the time t0, the cooling performance of the intercooler 13 subsequently becomes insufficient and the intake air temperature TA1 in the intake pipe 16, measured by the first intake-air temperature sensor 17, and the intake air temperature TA2 in the intake manifold 15, measured by the second intake-air temperature sensor 19, are increased, as illustrated in FIG. 4A.

Figure 4B:
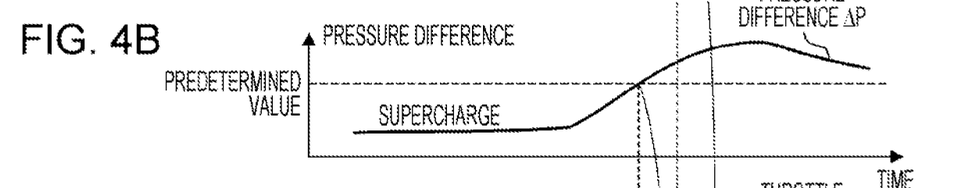
Figure 4C:
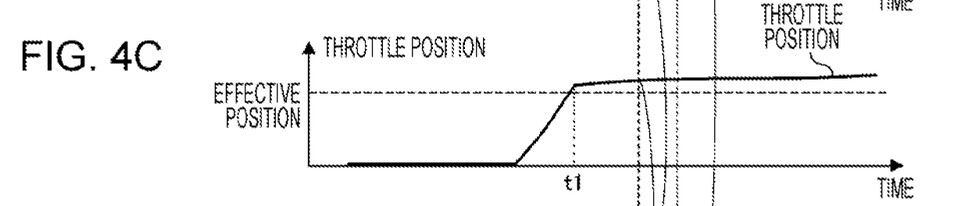

When the accelerator is depressed at this time, the throttle position of the throttle valve 14 is increased, as illustrated in FIG. 4C. It is detected at a time t1 that the throttle position is greater than a predetermined position.

The pressure difference $\Delta P$ between the pressure PA2 in the intake manifold 15, measured by the second intake-air pressure sensor 20, and the atmospheric pressure PA measured by the atmospheric pressure sensor 23 is increased due to the supercharge by the turbo charger 12, as illustrated in FIG. 4B. Then, it is detected at a time t2 that the pressure difference $\Delta P$ becomes greater than a predetermined value.

Since it is detected at the time t2 that the throttle position is greater than the predetermined position and that the pressure difference $\Delta P$ described above is greater than the predetermined value, the load state determiner 3 determines that the engine 1 is in the high load state at the time t2.

Figure 4D:
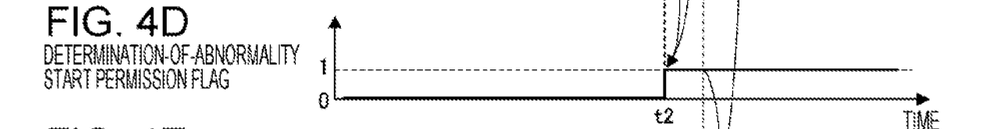

When it is determined at the time t2 that the engine 1 in is the high load state, a "determination-of-abnormality start permission flag" is switched from "0" to "1", as illustrated in FIG. 4D. In response to switching of the "determination-of-abnormality start permission flag" from "0" to "1", the abnormality determiner 4 starts a process of comparing the intake air temperature TA1 measured by the first intake-air temperature sensor 17 and the intake air temperature TA2 measured by the second intake-air temperature sensor 19 with a predetermined threshold value.

Since the engine 1 is in the high load state at the time t2, the intake air temperatures TA1 and TA2 continue to increase, as illustrated in FIG. 4A.

Figure 4E:
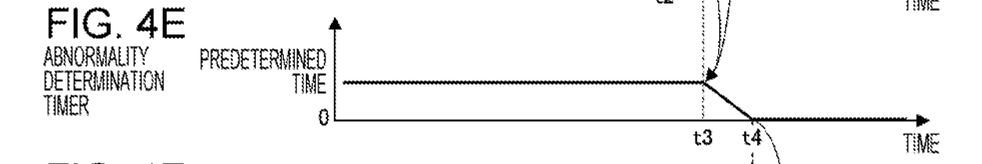

Then, at a time t3, the intake air temperature TA1 measured by the first intake-air temperature sensor 17 exceeds the threshold value. Here, the intake air temperature TA2 measured by the second intake-air temperature sensor 19 does not exceed the threshold value. However, since the intake air temperature measured by at least one intake air temperature sensor, among the two intake air temperature sensors, exceeds the threshold value, the countdown of an abnormality determination timer is started at the time t3, as illustrated in FIG. 4E.

The characteristic abnormality due to a shift of the zero point occurs in the second intake-air temperature sensor 19 and the second intake-air temperature sensor 19 outputs a temperature lower than the actual temperature. Also in such a case, it is possible to appropriately perform the process of detecting the intake-air temperature abnormal state in the first embodiment because the two intake air temperature sensors are used. It is possible to appropriately perform the process of detecting the intake-air temperature abnormal state also if a characteristic abnormality occurs in the first intake-air temperature sensor 17 and the second intake-air temperature sensor 19 is in a normal condition.

Then, the countdown of the abnormality determination timer is continued while the state is continued in which the intake air temperature TA1 measured by the first intake-air temperature sensor 17 exceeds the threshold value, as illustrated in FIG. 4A. At a time t4, the value of the abnormality determination timer is decreased to zero, as illustrated in FIG. 4E.

Figure 4F:
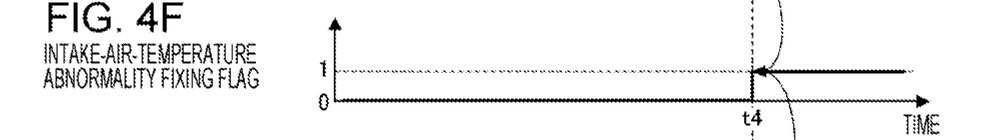

When the value of the abnormality determination timer is decreased to zero, the abnormality determiner 4 in the ECU 2 detects the intake-air temperature abnormal state and an "intake-air-temperature abnormality fixing flag" is switched from "0" to "1" at the time t4, as illustrated in FIG. 4F. The abnormality determiner 4 in the ECU 2 determines that an abnormality occurs in the intercooler cooling water circuit 30, which is the intake air cooling apparatus.

Figure 4G:
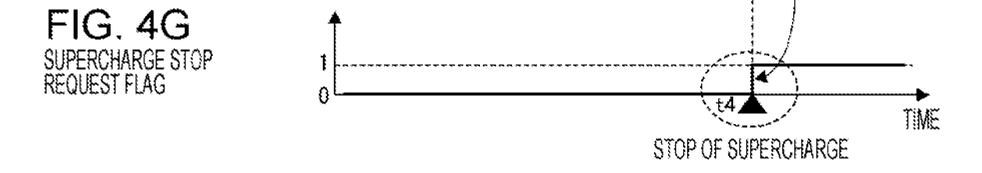

When the "intake-air-temperature abnormality fixing flag" is switched from "0" to "1" at the time t4, as illustrated in FIG. 4F, a "supercharge stop request flag" for requesting the turbo charger 12 to stop the supercharge is switched from "0" to "1", as illustrated in FIG. 4G.

Through the above process, it is possible to reliably detect the intake-air temperature abnormal state without delay and determine that an abnormality occurs in the intercooler cooling water circuit 30 including the intercooler 13 also if a characteristic abnormality (for example, a shift of the zero point due to deterioration or abnormal correlation between actual temperatures and outputs from the sensors) occurs in one of the first intake-air temperature sensor 17 and the second intake-air temperature sensor 19. In the first embodiment, the abnormality determiner 4 appropriately detects that the abnormality occurs in the intercooler cooling water circuit 30 due to the leakage of the cooling water. In addition, since the control is performed so as to stop the supercharge at this time in the first embodiment, the intake air temperature is started to be decreased before the intake air temperature enters a hardware NG zone illustrated in FIG. 4A. Accordingly, troubles including boiling of the cooling water and the thermal damage to the throttle valve 14 are appropriately prevented.

Although the water-cooled intercooler cooling water circuit 30 is used as the intake air cooling apparatus in the above embodiment, the intake air cooling apparatus is not limited to this. For example, an air-cooled intake air cooling apparatus may be used as the intake air cooling apparatus.

The following advantages are achieved according to the intake air cooling apparatus abnormality detection system according to the first embodiment.

(1) In the intake air cooling apparatus abnormality detection system according to the first embodiment, if the state in which at least one of the value based on the output from the first intake-air temperature sensor 17 and the value based on the output from the second intake-air temperature sensor 19 exceeds a predetermined threshold value continues for a certain time or longer when it is determined that the engine 1 is in a certain load state, it is determined that an abnormality occurs in the intercooler cooling water circuit 30.

Accordingly, when the engine 1 is in the high load state even if a characteristic abnormality occurs in one of the intake air temperature sensors, it is possible to reliably determine that an abnormality occurs in the intercooler cooling water circuit 30 without delay.

(2) In the intake air cooling apparatus abnormality detection system according to the first embodiment, if it is determined that an abnormality occurs in the intercooler cooling water circuit 30, the supercharge stop request signal for requesting the turbo charger 12 to stop the supercharge is output. Accordingly, it is possible to prevent the thermal damage to the throttle valve 14 or the like.

(3) In the intake air cooling apparatus abnormality detection system according to the first embodiment, the load state determiner 3 determines that the engine 1 is in the high load state in the state in which the pressure difference between the atmospheric pressure and the pressure in the intake manifold 15 is greater than a predetermined value and/or in the state in which the position of the throttle valve 14 is greater than a predetermined position. Accordingly, it is possible to accurately determine the load state of the engine 1.

Second Embodiment

An intake air cooling apparatus abnormality detection system according to a second embodiment of the present disclosure will herein be described in detail with reference to the drawings. The same reference numerals are used in the second embodiment to identify the same components in the first embodiment. A description of such components is omitted herein.

Figure 5:
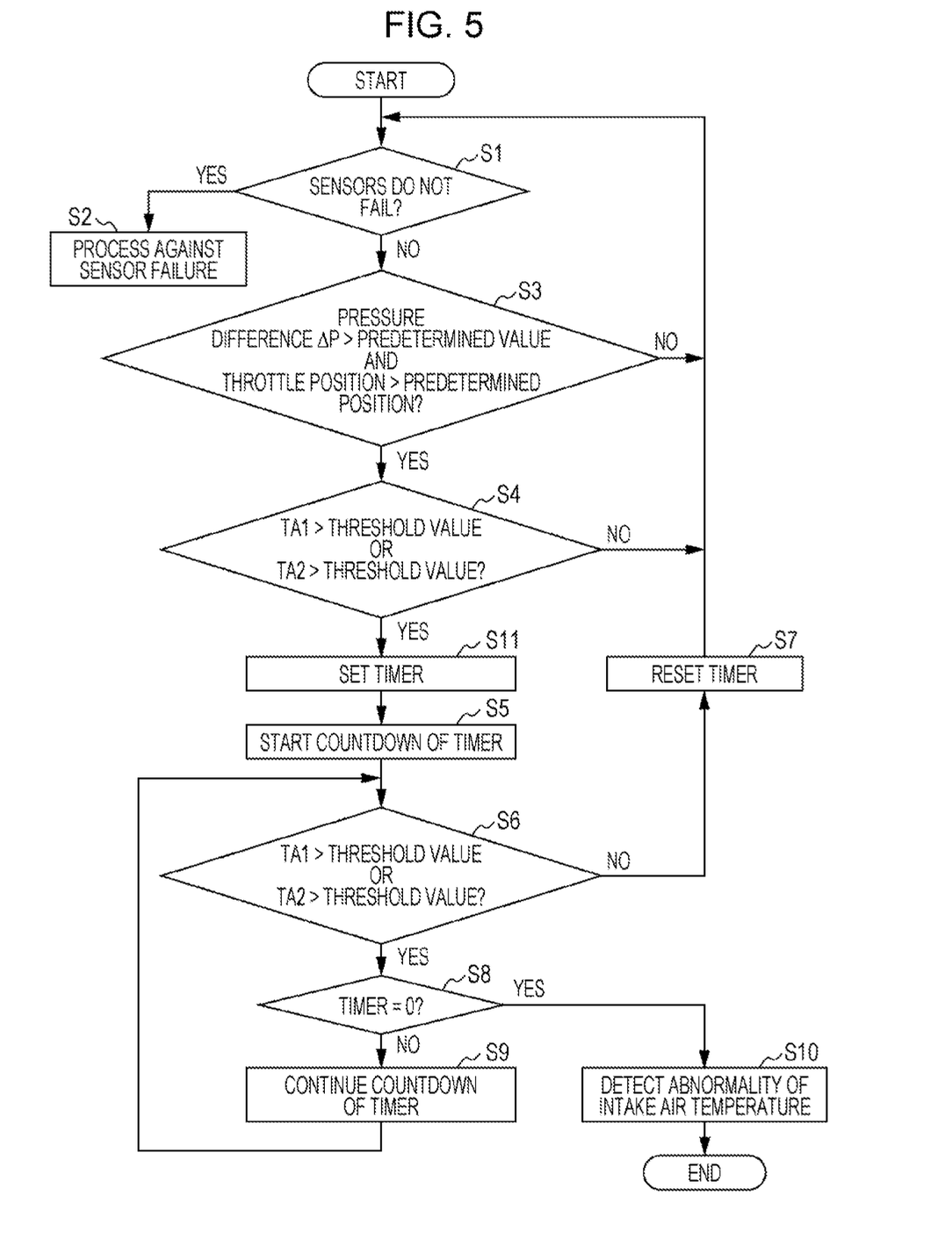
FIG. 5 is a flowchart illustrating a specific example of an abnormality determination process in an intake air cooling apparatus abnormality detection system according to a second embodiment of the present disclosure.

FIG. 5 is a flowchart in the second embodiment.

In the second embodiment, as illustrated in FIG. 5, Step 11 for setting the timer is inserted between Step S4 and Step S5 in the flowchart in the first embodiment illustrated in FIG. 2.

In general, the intake air temperature is rapidly increased as the degree of supercharge by the turbo charger 12 is increased. Accordingly, it is preferred that an abnormality in the intercooler cooling water circuit 30 be rapidly detected as the degree of supercharge by the turbo charger 12 is higher.

The pressure difference $\Delta P$ between the atmospheric pressure PA and the pressure PA2 in the intake manifold 15 is a value that reflects the supercharge state by the turbo charger 12.

Accordingly, in the second embodiment, the setting time of the timer when the countdown is started after Step S5 is set in accordance with the pressure difference $\Delta P$ between the atmospheric pressure PA and the pressure PA2 in the intake manifold 15 in Step S11. More specifically, as illustrated in a graph in FIG. 6, the setting time of the timer is shortened as the pressure difference $\Delta P$ between the atmospheric pressure PA and the pressure PA2 in the intake manifold 15 is increased.

Figure 6:
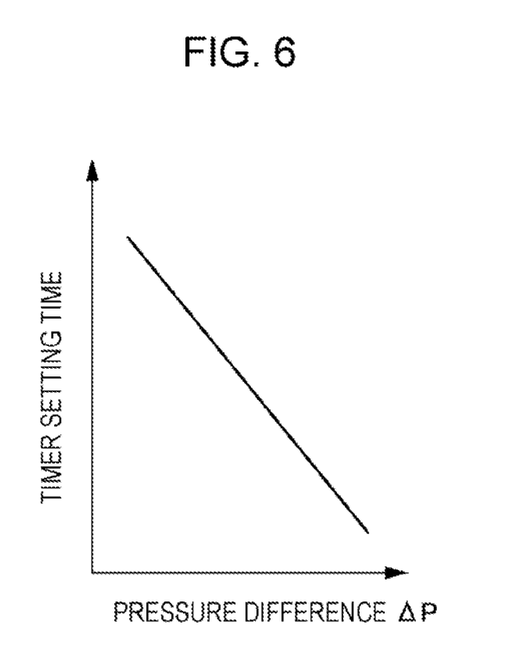
FIG. 6 is a graph illustrating the relationship between a pressure difference between atmospheric pressure and pressure in a intake manifold and a setting time of a timer in the intake air cooling apparatus abnormality detection system according to the second embodiment.

Setting the setting time of the timer in the above manner enables the certain time before it is determined that an abnormality occurs in the intercooler cooling water circuit 30 to be shortened in accordance with the supercharge state by the turbo charger 12 to more appropriately detect the abnormality in the intercooler cooling water circuit 30.

In the second embodiment, the pressure difference $\Delta P$ between the atmospheric pressure PA and the pressure PA2 in the intake manifold 15 is used as information for acquiring the load state of the engine 1 and is also used as information for setting the certain time before it is determined that an abnormality occurs in the intercooler cooling water circuit 30.

Accordingly, it is possible to appropriately perform the abnormality determination process with a small amount of signal processing.

The following advantages are achieved, in addition to (1) to (3) described above, according to the intake air cooling apparatus abnormality detection system according to the second embodiment.

(4) In the intake air cooling apparatus abnormality detection system according to the second embodiment, the certain time described above is set in accordance with the pressure difference between the atmospheric pressure and the pressure in the intake manifold 15.

The pressure difference between the atmospheric pressure and the pressure in the intake manifold 15 is a value that reflects the supercharge state by the turbo charger 12. Accordingly, according to the second embodiment, it is possible to appropriately set the certain time before it is determined that an abnormality occurs in the intercooler cooling water circuit 30 in accordance with the supercharge state by the turbo charger 12.

(5) In the intake air cooling apparatus abnormality detection system according to the second embodiment, the certain time is shortened as the pressure difference between the atmospheric pressure and the pressure in the intake manifold 15 is increased.

The degree of supercharge is increased as the pressure difference between the atmospheric pressure and the pressure in the intake manifold 15 is increased. Since the intake air temperature is rapidly increased at this time, it is preferred that the abnormality in the intercooler cooling water circuit 30 be rapidly detected. Accordingly, according to the second embodiment, shortening the certain time before it is determined that an abnormality occurs in the intercooler cooling water circuit 30 in accordance with the supercharge state by the turbo charger 12 enables the abnormality in the intercooler cooling water circuit 30 to be more effectively detected.

The present disclosure is not limited to the above embodiments and various changes and modifications may be made to the present disclosure within the spirit and scope of the present disclosure.

What is claimed is:

1. A system for detecting an abnormality of an intake air cooling apparatus, the system comprising:
    the intake air cooling apparatus comprising a heat exchanger that is provided at a downstream side of a supercharger;
    a first intake air temperature sensor configured to detect an intake air temperature in an intake pipe that is provided at a downstream side of the heat exchanger and at an upstream side of an intake valve;
    a second intake air temperature sensor configured to detect the intake air temperature in an intake manifold provided at the downstream side of the intake valve;
    a load state determiner configured to determine a load state of the internal combustion engine; and
    an abnormality determiner configured to determine whether an abnormality occurs in the intake air cooling apparatus including the heat exchanger,
    wherein the abnormality determiner determines that the abnormality occurs in the intake air cooling apparatus when the following conditions are met: it is detected that at least one of a value of the intake air temperature outputted from the first intake air temperature sensor and a value of the intake air temperature outputted from the second intake air temperature sensor exceeds a predetermined threshold value and the detection of the value of the intake air temperature which exceeds the predetermined threshold value continues for a predetermined time or longer in a state where the load state determiner determines that the internal combustion engine is in a predetermined load state, and
    wherein the predetermined time is set in accordance with a pressure difference between atmospheric pressure and pressure in the intake manifold.

2. The system according to claim 1,
    wherein the predetermined time is set to be shortened as the pressure difference between the atmospheric pressure and the pressure in the intake manifold is increased.

3. The system according to claim 1,
    wherein, when the abnormality determiner determines that the abnormality occurs in the intake air cooling apparatus, a supercharge stop request signal for requesting the supercharger to stop supercharge is output to the supercharger.

4. The system according to claim 1,
    wherein the load state determiner determines that the internal combustion engine is in the predetermined load state when any one of the following conditions (i)-(iii) is met:
    (i) a pressure difference between atmospheric pressure and pressure in the intake manifold is greater than a predetermined value and in a state in which a position of the intake valve is greater than a predetermined position;
    (ii) the pressure difference between the atmospheric pressure and the pressure in the intake manifold is greater than the predetermined value; or
    (iii) the position of the intake valve is greater than the predetermined position.

* * * * *